United States Patent [19]

Ito

[11] 4,321,748

[45] Mar. 30, 1982

[54] SMALL DYNAMOELECTRIC MACHINE AND METHOD FOR MAKING SAME

[75] Inventor: Isao Ito, Handa, Japan

[73] Assignee: Nippondenso Co., Ltd., Kariya, Japan

[21] Appl. No.: 113,199

[22] Filed: Jan. 18, 1980

Related U.S. Application Data

[62] Division of Ser. No. 850,033, Nov. 9, 1977, abandoned.

[30] Foreign Application Priority Data

Dec. 2, 1976 [JP] Japan .................................. 51-145440
Jul. 1, 1977 [JP] Japan .................................. 52-877201

[51] Int. Cl.³ ............................................ H02K 15/14
[52] U.S. Cl. ........................................ 29/596; 310/42; 310/43; 310/90
[58] Field of Search ................ 29/596, 598; 310/42, 310/43, 90, 91

[56] References Cited

U.S. PATENT DOCUMENTS 3,397,929 8/1968 Gill et al. .......................... 310/90 X

*Primary Examiner*—Carl E. Hall
*Attorney, Agent, or Firm*—Cushman, Darby & Cushman

[57] ABSTRACT

In assembling a rotor into a small electric rotary machine, a spacer made of resinous material is provided to have an ideal axial play for the rotor. When the rotor is assembled into a housing, the resinous spacer is made to be soft enough to allow encroachment of the rotor shaft end until the rotor is placed in the right place. Thereafter, the spacer is made hard enough to support the axial movement of the rotor when the motor operates. Since the resinous spacer shrinks after hardening it provides an ideal axial play for the rotor.

6 Claims, 3 Drawing Figures

SMALL DYNAMOELECTRIC MACHINE AND METHOD FOR MAKING SAME

This is a division of application Ser. No. 850,033, filed Nov. 9, 1977, now abandoned.

BACKGROUND OF THE INVENTION

The present invention relates to an improvement in a small dynamoelectric machine and in a method for making same, especially in a thrust adjusting arrangement of a rotary machine.

In a conventional electric rotary machine, the axial movement of the rotor shaft is adjusted by a screw bolt having a concave axial end surface for holding one end of the rotor shaft. The screw bolt is moved forward or backward to decrease or increase the gap between the concave surface and the rotor shaft end until the rotor is carried properly. When the adjustment is completed, the screw bolt is fixed by a nut.

If the adjustment is not made properly, friction loss and noises may cause trouble.

SUMMARY OF THE INVENTION

Therefore, it is a primary object of the present invention to ensure a proper adjustment of the axial movement of the rotor shaft.

It is another object of the present invention to provide an improved dynamoelectric machine with a simpler construction for adjusting the axial movement of the rotor shaft.

It is a further object of the present invention to provide an improved method of making a rotary machine.

Other objects and advantageous feature of the present invention will be more apparent from the following description.

DESCRIPTION OF THE PREFERRED EMBODIMENT

Figure 1:
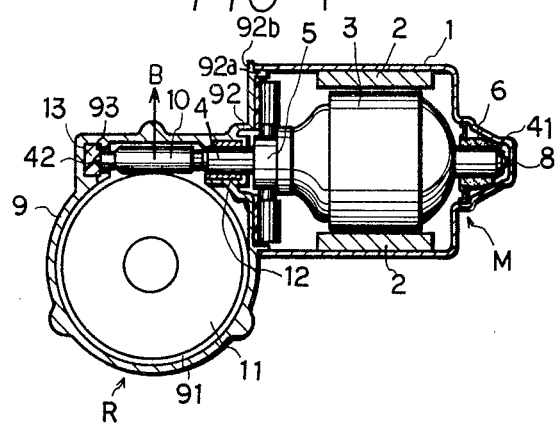
FIG. 1 is a sectional side view of a preferred embodiment according to the present invention.

FIG. 1 shows a windshield wiper motor according to the present invention. The windshield wiper is comprised of a motor section M and a reduction gear section R. The motor section M comprises a yoke 1, a pair of permanent magnets 2 secured to the yoke 1, a rotor 3 with a shaft 4 and a commutator and a bearing 6 carrying the shaft 4 at the bottom of said yoke 1. On the right hand end 41 of the shaft 4, a concave axial end surface is formed to receive a small ball 8 between the small concave and the bottom wall of the yoke 1 to support the thrusting force of the shaft 2. The reduction gear section comprises a gear case 9 formed with a reduction gear compartment 91, a bearing housing section 92 and a recess 93. In the reduction gear compartment 91, a worm gear 10 which is formed on the shaft 4, and a spur gear 11 are disposed. The bearing housing 92 is provided with a cylindrical portion 92a telescopically secured to the open end of the yoke 1, a shoulder portion 92b and a bearing 12 through which the worm gear portion of the shaft 2 extends toward the recess 93. In the recess 93, a spacer 13 of thermoplastic resin, preferably polyacetal, is provided. On the left hand end 42 of the shaft 4, a conical surface is formed to encroach upon the spacer 13. It is noted that the cylindrical portion 92a is arranged to be telescoped into the yoke 1 when the rotor is installed and the left hand end 42 of the shaft 4 abuts the spacer 13. The encroachment is attained in the following manner.

When the motor section M and the reduction gear section R are assembled, the left hand end 42 of the shaft 4 abuts the spacer 13. In this state, the telescopic connection of the yoke and the cylindrical portion 92a of the bearing housing 92 is ensured, thus ensuring the center of the rotor axis. The thermoplastic-resinous spacer 13 is then heated by, for example, supersonic wave energy to become soft enough to deform on moderate pressure. The conical surface 42 of the shaft 4 is then pressed through the yoke 1 on the spacer until the open end of the yoke 1 abuts the shoulder 92b of the bearing housing 92 and the rotor 3 and the worm gear 10 are fixed in the right place. Thereafter, the spacer 13 is allowed to cool down to become hard. When the spacer 13 cools down, its shrinks to form a proper gap between the spacer 13 and the conical surface 42. This gap provides an ideal play for fixing the rotor 3 and the worm gear 10. The gear compartment 91 and the recess 92 of the reduction gear housing 9 are then covered by a cover plate (not shown) in the known manner. Since the operation of the windshield wiper motor is well known, the description thereof is omitted. However, it should be noted that in usual operation the thrusting force of the rotor shaft 4 does not act on the spacer 13 but acts on the ball 8 and, therefore, the spacer 13 is not required much lubrication or resistance to abrasion.

Figure 2:
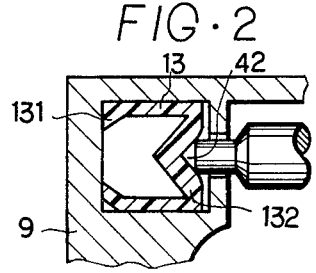
FIG. 2 is an enlarged sectional view of a spacer of a second embodiment according to the present invention.

In FIG. 2, a modified spacer 13 is shown. In this embodiment, the spacer is cup-shaped member made of thermoplastic material such as polyacetal. The spacer 13 is provided with a foot 131, at the open end thereof and a concave axial end surface 132 at the outside thereof. The conical surface 42 of the shaft 4 is snugly fitted in the concave axial end surface 132 of the spacer.

This arrangement is attained in the following manner.

When the motor section M and the reduction gear R are assembled, the conical shaft end 42 abuts and pushes the spacer 13 until the rotor 3 and the worm gear 10 are fixed in yoke 1 and the reduction gear housing 9. In this state the foot 131 of the spacer 13 is resiliently bent, receiving the conical surface 42 of the shaft 4 in the concave of the spacer. Thereafter, the spacer is heated in the same manner previously described to eliminate the residual stress of the bent foot 131. After the spacer 13 cools down, the conical surface 42 is snugly received by the spacer 13 with an ideal play for the rotor operation.

Figure 3:
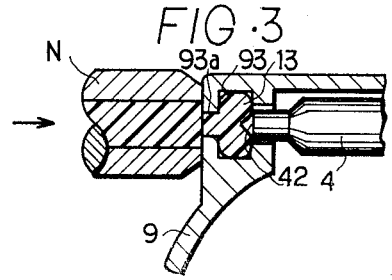
FIG. 3 is an enlarged sectional view of a spacer and a nozzle for filling the spacer material of a third embodiment.

FIG. 3 shows a third embodiment, in which thermoplastic resin such as polyacetal is heated and is filled into the recess 93 through a nozzle N under pressure after the rotor 3 and the worm 10 are fixed in the right place of the yoke 1 and the reduction housing.

As previously mentioned, when the polyacetal cools down, it shrinks to provide the ideal play for the motor operation.

It should be noted that the spacer may be any material which is soft when the motor is assembled and which is made hard when the motor is completed.

Thermosetting resin is also available. In such a case the spacer is heated to be hardened after the motor assembling is completed.

It is apparent that the present invention may be applied to various small dynamoelectric machines other than the above described windshield wiper motor.

What is claimed is:

1. A method for providing a predetermined amount of axial play for an end of the rotor shaft of the rotor of a small dynamoelectric machine with respect to the stator housing of this machine, comprising the steps of:

providing said rotor shaft end with a generally convex end surface;

interposing a body of moldable plastic material in said recess between said shaft end and said stator housing, which plastic material has as an essential characteristic that it shrinks by a predetermined amount upon being hardened;

urging said shaft end toward said recess, in an act of installing said rotor shaft in said stator housing, sufficiently to deformably mold the plastic material between said shaft end and said stator housing until (a) said body has a correspondingly concave axial end surface;

(b) said rotor shaft is correctly axially positioned with regard to the stator housing; and limiting play of the rotor to a predetermined amount by hardening said plastic material while said rotor shaft remains having said correct axial positioning.

2. The method of claim 1, further comprising:

providing said stator housing recess as a socket.

3. The method of claim 2 wherein:

said step of interposing a body of moldable plastic material comprises covering said rotor shaft at said end with a resinous plastic material.

4. A method for providing a desirable amount of axial play for the rotor shaft of a small electric machine having a housing, a stator, a rotor, a rotor shaft and bearings, said method comprising the steps of:

providing said rotor shaft with a generally convex shaft end;

providing said housing with a shaft receiving section;

interposing a deformable plastic material in said shaft receiving section;

installing said rotor shaft in said housing, and in so doing, positioning said convex shaft end in said shaft receiving section to the extent that said convex shaft end firmly abuts said plastic material;

heating said plastic material to the extent that said plastic material deforms to softly cover said convex shaft end; and cooling said plastic material so that said plastic material shrinks to provide a desirable amount of restricted axial play for said rotor.

5. A method according to claim 4, wherein said deformable plastic material is initially shaped to have a resilient foot which abuts the inner wall of said housing in said positioning step and a concave wall which receives said convex shaft end in said positioning step.

6. A method for providing a desirable amount of axial play for the rotor shaft of a small electric machine having a housing, a stator, a rotor, a rotor shaft and bearings, said method comprising the steps of:

providing said rotor shaft with a generally convex shaft end;

providing said housing with a shaft receiving section;

positioning said convex shaft end in said shaft receiving section in an act of installing said rotor shaft in said housing;

filling said shaft receiving section with a heated plastic material to the extent that said plastic material softly covers said convex shaft end; and cooling said plastic material so that said plastic material shrinks to provide a desirable amount of restricted axial play for said rotor.

* * * * *

UNITED STATES PATENT AND TRADEMARK OFFICE
CERTIFICATE OF CORRECTION

PATENT NO. : 4,321,748
DATED : March 30, 1982
INVENTOR(S) : Isao ITO

It is certified that error appears in the above—identified patent and that said Letters Patent is hereby corrected as shown below:

In the Heading re Priority Data [Item 30]

Second line:

Read: --July 1, 1977 [JP] Japan...52-87720--

Signed and Sealed this

Twenty-first Day of September 1982

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,321,748

DATED : March 30, 1982

INVENTOR(S) : Isao ITO

It is certified that error appears in the above-identified patent and that said Letters Patent is hereby corrected as shown below:

In claim 1, column 3, line 15, change "said" to --a--.

Signed and Sealed this

Ninth Day of March, 1993

Attest:

STEPHEN G. KUNIN

*Attesting Officer*   *Acting Commissioner of Patents and Trademarks*